United States Patent
Hu et al.

(10) Patent No.: US 8,611,762 B2
(45) Date of Patent: Dec. 17, 2013

(54) SYSTEM AND METHOD FOR FREQUENCY-DOMAIN CHROMATIC DISPERSION AND POLARIZATION MODE DISPERSION COMPENSATION WITH TIME-DOMAIN CHANNEL ESTIMATION

(75) Inventors: Junqiang Hu, Davis, CA (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 446 days.

(21) Appl. No.: 12/943,574

(22) Filed: Nov. 10, 2010

(65) Prior Publication Data

US 2012/0114341 A1    May 10, 2012

(51) Int. Cl.
    *H04B 10/00* (2013.01)
(52) U.S. Cl.
    USPC ............ 398/208; 398/147; 398/158; 398/159
(58) Field of Classification Search
    USPC .................................... 398/208–211
    See application file for complete search history.

(56) References Cited

U.S. PATENT DOCUMENTS

| | | | | |
|---|---|---|---|---|
| 6,239,843 B1 * | 5/2001 | Gaudreau | ................ | 348/465 |
| 7,769,305 B1 * | 8/2010 | Roberts et al. | ................ | 398/206 |
| 8,005,368 B2 * | 8/2011 | Roberts et al. | ................ | 398/150 |
| 8,218,979 B2 * | 7/2012 | Liu | ................ | 398/208 |
| 8,385,747 B2 * | 2/2013 | Roberts et al. | ................ | 398/150 |
| 2006/0285855 A1 * | 12/2006 | Sun et al. | ................ | 398/155 |
| 2007/0092260 A1 * | 4/2007 | Bontu et al. | ................ | 398/152 |
| 2009/0148164 A1 * | 6/2009 | Roberts et al. | ................ | 398/65 |
| 2009/0256622 A1 * | 10/2009 | Roberts | ................ | 327/512 |
| 2010/0119241 A1 * | 5/2010 | Yang et al. | ................ | 398/208 |
| 2011/0002689 A1 * | 1/2011 | Sano et al. | ................ | 398/44 |
| 2011/0064421 A1 * | 3/2011 | Zhang et al. | ................ | 398/208 |
| 2012/0033965 A1 * | 2/2012 | Zhang et al. | ................ | 398/38 |
| 2012/0087680 A1 * | 4/2012 | Xie | ................ | 398/208 |
| 2012/0099637 A1 * | 4/2012 | Hu et al. | ................ | 375/232 |
| 2012/0114341 A1 * | 5/2012 | Hu et al. | ................ | 398/208 |

OTHER PUBLICATIONS

Geyer, J.C., et al. "Efficient Frequency Domain Chromatic Dispersion Compensation in a Choerent Polmux QPSK-Receiver", National Fiber Optic Engineer Conference, Mar. 2010, 3 pages.
Kuschnerov, M. et al., "DSP for Coherent Single-Carrier Receivers", Journal of Lightwave Technology, vol. 27, No. 16, Aug. 15, 2009, 9 pages.

* cited by examiner

*Primary Examiner* — Nathan Curs
*Assistant Examiner* — Tanya Motsinger
(74) *Attorney, Agent, or Firm* — Joseph Kolodka (57) ABSTRACT

A system and method are disclosed which compensate for chromatic dispersion and polarization mode dispersion in a digital signal. The signal is adjusted for chromatic dispersion in the frequency-domain. The signal is then converted to the time-domain and at least a portion of the signal is estimated to produce channel parameters. The channel parameters are converted to the frequency domain and used to compensate for polarization mode dispersion in the signal.

15 Claims, 6 Drawing Sheets

SYSTEM AND METHOD FOR FREQUENCY-DOMAIN CHROMATIC DISPERSION AND POLARIZATION MODE DISPERSION COMPENSATION WITH TIME-DOMAIN CHANNEL ESTIMATION

BACKGROUND

1. Technical Field

The present invention relates to processing digital signals, and more particularly, to compensating for chromatic dispersion and polarization mode dispersion in digital signals.

2. Description of the Related Art

In an optical communication system, chromatic dispersion and polarization mode dispersion may distort a transmitted signal. However, these abnormalities in the signal may be corrected at the receiver. While adjustments for chromatic dispersion may be fixed for a given channel, adjusting a channel for polarization mode dispersion involves dynamically adjusting the signal using channel estimates. In conventional systems, the equalization of an input signal is processed block-by-block, with each block having a fixed size that is equal to the block size utilized by the fast Fourier transform (FFT) and inverse fast Fourier transform (IFFT). As equalization is performed on a block-by-block basis, the output signal may be used as feedback for estimating channel parameters.

However, a problem arises due to the fact that channel parameters are estimated using feedback from the output signal. Since the equalization scheme processes the signal on A block-by-block basis, the channel parameters used in compensating for polarization mode dispersion can only be updated once every FFT block size. Given that the FFT block size can be relatively large, the updating speed may be very slow, thus resulting in slow channel tracking capability.

SUMMARY

In accordance with the present principles, a method for processing a signal. Chromatic dispersion in compensated for in a signal in the frequency-domain. At least a portion of the signal which has been compensated for chromatic dispersion is estimated in a time-domain to produce channel parameters. Polarization mode dispersion in the signal is then compensated for in the frequency-domain using the channel parameters.

In accordance with the present principles, a system is also disclosed for processing a signal. The system includes a first compensator configured to adjust a signal for chromatic dispersion in a frequency-domain. A channel estimator is configured to estimate at least a portion of the signal which has been compensated for chromatic dispersion in a time-domain to produce channel parameters. The system also includes a second compensator configured to adjust the signal for polarization mode dispersion in the frequency-domain using the channel parameters.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a system and method for compensating for chromatic dispersion (CD) and polarization mode dispersion (PMD) operating at a receiver is disclosed. In contrast to conventional receivers, the receiver described herein permits high-speed channel estimation in a receiver that is not limited by the fast Fourier transform (FFT) block size. Rather than estimating a channel using the output of an equalized signal where the updating rate is limited to the block size used by the FFT, channel parameters are estimated after the signal has been adjusted for chromatic dispersion, but before the signal has been processed for polarization mode dispersion.

As explained in further detail below, the operations for performing chromatic dispersion and polarization mode dispersion are performed separately. Chromatic dispersion and polarization mode dispersion in a digital signal compensated for in the frequency-domain, while channel estimation is performed in the time-domain. A CD compensator first adjusts the signal for chromatic dispersion in the frequency domain. The output from the CD compensator is then coupled to both a PMD compensator and a channel estimator. Before the channel estimator derives channel parameters, the signal is converted to the time domain. Once the channel parameters have been ascertained, the parameters are converted back to the frequency domain and supplied to the PMD compensator. The PMD compensator uses the channel parameters to adjust the signal supplied by the CD compensator for polarization mode dispersion. The output from the PMD compensator is then converted to the time domain before being output.

The principles taught herein differ from conventional schemes which derive channel parameters from an already equalized output signal, and then use the channel parameters to adjust subsequently received signals. Since such conventional schemes perform equalization on a block-by-block basis (with each block having a fixed size that is equal to the block size utilized by the FFT and IFFT), the channel parameters used in compensating for polarization mode dispersion can only be updated once every FFT block size. Given that a block size can be relatively large, the updating speed may be very slow, thus resulting in slow channel tracking capability.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Upon reading the disclosure herein, it should be readily apparent that the present principles may be utilized in wide variety of applications, including but not limited to, applications which involve transmitters and receivers. For example, the techniques taught herein may be utilized in a receiver to compensate for dispersion in a received signal. As another example, the present principles may also be employed in a transmitter to compensate for dispersion in a signal which is to be transmitted.

Figure 1:
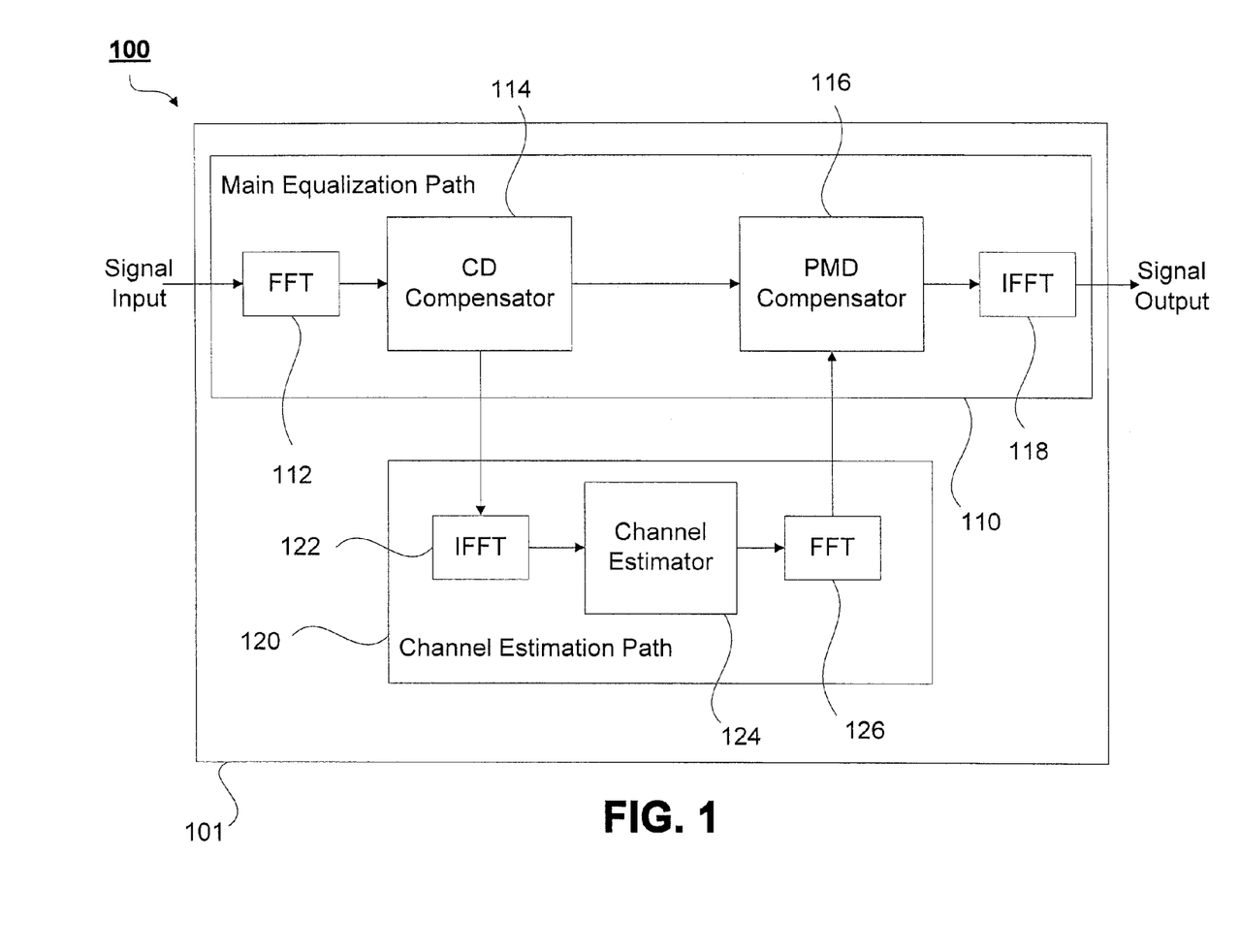
FIG. 1 is a block/flow diagram illustrating a high-level architecture for a receiver in accordance with the present principles.

Referring now to the drawings in which like numerals represent the same or similar elements and initially to FIG. 1, a block/flow diagram is provided which illustratively depicts a high-level architecture for a receiver system 100 in accordance with the present principles. The receiver 101 comprises two main blocks: main equalization path 110 and channel estimation path 120. The main equalization path 110 adjusts inputted signals to compensate for chromatic dispersion (CD) and polarization mode dispersion (PMD). The channel estimation path 120 tracks changes in the input signal and estimates channel parameters which are used by a PMD compensator to adjust for polarization mode dispersion.

As illustrated in FIG. 1, the receiver system 100 receives an input signal in the time domain at block 112. The signal is converted from the time domain to the frequency domain by fast Fourier transform (FFT) 112. After the signal is converted to the frequency domain, the signal is received by chromatic dispersion compensator 114 which adjusts the signal for chromatic dispersion. Adjusting the signal for chromatic dispersion may involve complex multiplication operations using a coefficient. The coefficient used for adjusting the signal may be stored in a memory device at the CD compensator 114. The coefficient stored in the memory may be configurable by an external interface or internal logic.

The signal output from the CD compensator 114, which has been adjusted to compensate for chromatic dispersion, is provided to both the channel estimation path 120 and the PMD compensator 116. The signal received by the channel estimation path 120 is converted to the time domain by inverse fast Fourier transform (IFFT) 122. The channel estimator 124 analyzes the signal in the time domain and tracks changes in the signal. The channel estimator 124 may analyze all of the data output from IFFT 122, or may take samples from the IFFT 122 output. The channel estimator 124 uses this data to estimate channel parameters for the signal.

The channel estimator 124 can produce channel parameters using any known, or later developed, channel estimation method. In one embodiment, the signal output from IFFT 322 includes training information, and channel parameters are produced using a training-based method such as least mean square (LMS). In another embodiment, channel parameters are determined using a blind method which utilizes, e.g., the constant modulus algorithm (CMA) or Shalvi-Weinstein algorithm (SWA), etc.

The channel parameters produced by the channel estimator 124 will be used by the PMD compensator 116 to adjust for polarization mode dispersion in the signal which is received from the CD compensator 114. However, before the channel parameters are provided to the PMD compensator 116, the channel parameters are converted back to the frequency domain. This conversion is performed by FFT 126. In preferred embodiments, FFT 126 converts the channel parameters to the frequency domain, while the actual signal is provided to the PMD compensator 116 by the CD compensator.

The channel parameters determined by the channel estimator 125 may vary. For example, the channel parameters determined by channel estimator 125 may represent finite impulse response (FIR) coefficients. After the FFT 126 converts the FIR coefficients to the frequency domain, these coefficients are used by the PMD compensator 116 to adjust the signal accordingly.

The signal output from the PMD compensator 116 represents a signal which has been adjusted for both chromatic dispersion and polarization mode dispersion. The corrected signal is fed to IFFT 118 which converts the signal back to the time domain. The signal is then output from the receiver.

Figure 2:
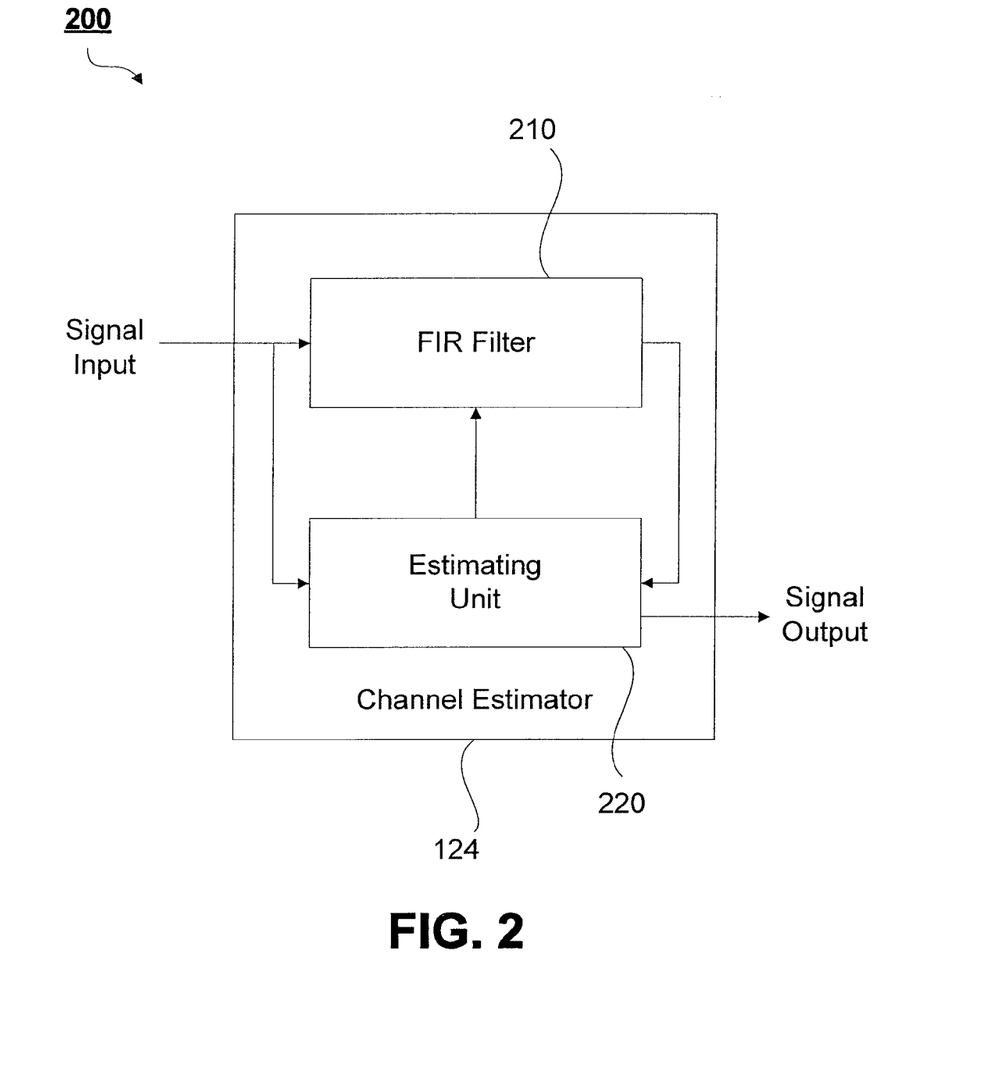
FIG. 2 is a block/flow diagram illustrating of a channel estimator in accordance with one embodiment of the present principles.

Moving on to FIG. 2, a block/flow diagram illustrates a channel estimator 124 in accordance with one embodiment of the present principles. As shown therein, the channel estimator 124 is a closed-loop and comprises FIR filter 210 and estimating unit 220. The signal input to the channel estimator 125 is provided to both the estimating unit 220 and the FIR filter 210. The estimating unit 220 employs an estimation method (e.g., regular CMA or SWA) to produce updated FIR coefficients. The FIR coefficients are sent to the FIR filter 210 to further calculate subsequent outputs from new inputs. In one embodiment of the present invention, the updated FIR coefficients are outputted while filtered results are used by estimating unit 220.

The output from the FIR filter 210 is provided back to the estimating unit 220 which uses an error function to determine the margin of error in the signal after filtering has been performed by the FIR filter 210 using the FIR coefficients. The estimating unit 220 may use the error information from the FIR filter 210 to update the FIR coefficients which are being supplied to the FIR filter 220 and to update the FIR coefficients which are being supplied to the PMD compensator 116.

Although the channel estimator 124 depicted in FIG. 2 comprises a closed-loop solution which uses feedback from the FIR filter 210 to compensate for PMD in the signal, it should be noted that open-loop solutions may also be employed at the channel estimator 124. In such an open-loop solution, the channel estimator 124 may use a batch CMA method or a batch SWA method at the estimating unit 220 to determine channel parameters (e.g., FIR coefficients) which are to be used for PMD compensation. However, in contrast to the closed-loop solution, the channel estimator 124 would not filter the signal (e.g., using FIR filter 210).

Figure 3:
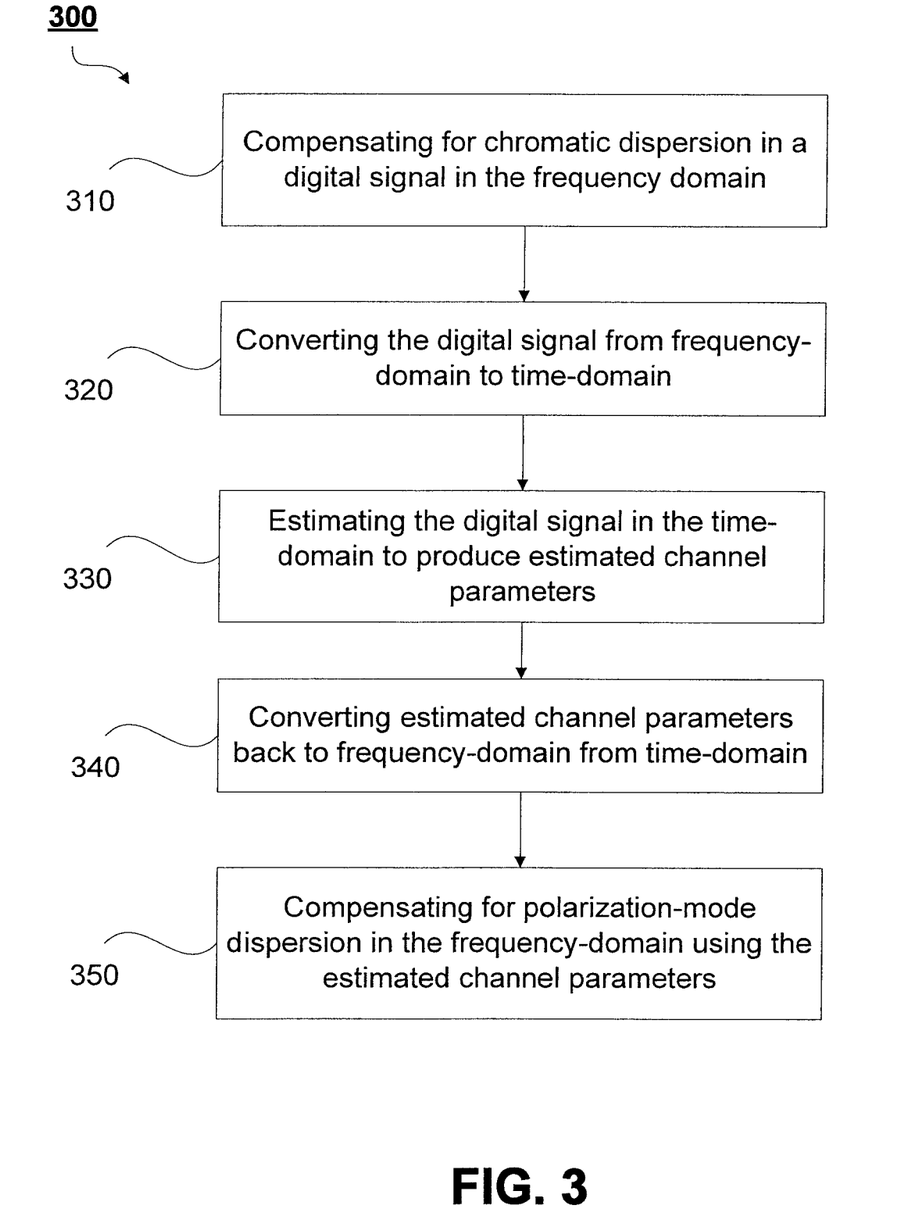
FIG. 3 is a block/flow diagram illustrating an exemplary method of compensating for chromatic dispersion and polarization mode dispersion in a signal at a receiver.

Referring now to FIG. 3, an exemplary method 300 of compensating for chromatic dispersion and polarization mode dispersion at a receiver is provided. In block 310, a digital signal is input to a receiver and the signal is adjusted for chromatic dispersion in the frequency-domain. Adjusting a signal for chromatic dispersion involves performing complex multiplication operations on the received signal. These adjustments are fixed for a given channel. Therefore, there is no need to estimate the channel for chromatic dispersion.

Next, in block 320, the signal, or at least part of the signal, is converted from the frequency domain to the time-domain. This conversion may be implemented using in an inverse Fast Fourier transform. One reason why the signal is converted to the time-domain is because a greater selection of channel estimation methods are available for operation in the time domain. These time-domain methods are simple and robust.

The time-domain signal is analyzed (e.g., by the channel estimator 124) to estimate channel parameters in block 330. Any channel estimation technique may be utilized including training techniques such as least mean square (LMS), or blind techniques which utilize a CMA or SWA method. The channel parameters which are estimated in block 330 may relate to any parameter that can be used to compensate for polarization mode dispersion in a signal. In preferred embodiments, the channel parameters are FIR coefficients which are used by an FIR filter to compensate for polarization mode dispersion in a signal.

After the channel parameters have been ascertained, the parameters are converted back to the frequency domain in block 340. This may be accomplished by using a Fast Fourier transform (e.g., FFT 126). It should be noted that while it may be possible to convert the entire signal in the time-domain back to the frequency domain, in preferred embodiments, only the channel parameters are converted to the frequency domain to save time and processing resources.

In block 350, the channel parameters are used to compensate for polarization mode dispersion in the frequency domain. This may involve complex multiplication operations.

For ease of understanding, the above description has omitted discussion regarding mixed rate processing or signal rate conversion at the receiver. However, it should be recognized that signal rate conversion may be appropriate where there are differing signal rates with respect to the input signal, the main equalization path 110 or the channel estimation path 120.

In one embodiment, the signal rate for the main equalization path 110 and the channel estimation path 120 are the same, but this rate differs from the rate of the input signal. In this case, the input signal is first passed through a resampling module (e.g., which may be located directly before FFT 112 in FIG. 1) to convert the signal to the rate that is used for main equalization path 310 and channel estimation path 320. In practice, this rate can be 2× of symbol rate.

It should be noted that providing a higher sampling rate for signals input to the main equalization path 110 calls for an increased processing capacity. This can be achieved by adjusting the sampling clock (not shown) which leads to proper input signal rate, or by inserting a resampling block before FFT block 312.

Consider another case where FFT 112 processes data at the same rate as input signal, while the output from FFT 112 is adjusted by removing some of the central frequency elements. This would have the same effect as time-domain resampling. This frequency-domain operation may result in a non-$2^n$ conversion block-size for IFFT 118. Given such, inverse operations performed at IFFT 118 may be replaced with a fast discrete Fourier Transform operation.

In another scenario, the time-domain sampling rate for input to IFFT 122 may be different than the sampling rate required for the channel estimator 324. In one embodiment, two resampling blocks can be placed in the channel estimation path 120: one being placed in between IFFT 122 and the channel estimator 124, while the other is placed in between channel estimator 124 and FFT 126.

In another embodiment, the sample rate conversion can be achieved in frequency domain by adding zeros to central ($\pi$) frequency elements if a higher sampling rate is needed, or alternatively, by removing frequency elements from the central ($\pi$) of the spectrum if a lower sampling rate is needed. In any case, the channel parameter(s) output from the channel estimator 124 must be converted to same rate as the main equalization path 110.

In yet another embodiment, this resampling of the channel parameter can be achieved as the signal is converted between the time-domain and frequency domain. The resampling of the channel parameter is based on the following three principles. First, the padding the signal with zeros in the time-domain has the same frequency response as the original signal, and it increases frequency-domain spectrum resolution. Second, padding the signal with zeros in the frequency-domain for the central frequency ($\pi$) elements results in time-domain interpolation. Third, removing elements in the frequency-domain from central frequency is equivalent to time-domain down sampling.

Assume the resampling ratio is P/Q where P and Q are integers, and P represents the frequency-domain processing sample rate and Q represents the time-domain channel estimation sampling rate. The resampling requires P-times up sample and then Q-times down sample. Further assume the number of taps used in channel estimation is T, and the FIR filtering is expressed as $f_0*x(n)+f_1*x(n+1)+f_2*x(n+2)+\ldots+f_{T-1}*x(n+T-1)$, where $f_i$ is FIR coefficient and $x(k)$ is input signal. In this case, coefficients resampling can be achieved by steps (a)-(f) listed below:

Step (a): Padding T*(Q−1) (or T*(N*Q−1) where N is any non-zero integer) zeros to the coefficients, to have $\{f_0, f_1, f_2, \ldots, f_{T-1}, 0, 0, \ldots, 0\}$. This produces an integer number of down-sampled taps.

Step (b): Convert the signal to the frequency domain by performing T*Q-point discrete Fourier transform (DFT), which will result in spectrum $F_a$.

Step (c): Insert (P−1)*T*Q zeros in the central frequency ($\pi$), resulting in spectrum $F_b = \{F_a(0), F_a(1), \ldots F_a(T*Q/2-1), 0, 0, \ldots, 0, F_a(T*Q/2), F_a(T*Q/2+1), \ldots, F_a(T*Q-1)\}$. Note that T*Q should be even number. If T*Q is not an even number, the padding in step (a) should be T*Q*2.

Step (d): Remove T*(Q−1) spectrum elements from $F_b$ in central frequency, resulting in $F_c$.

Step (e): Convert $F_c$ to the time-domain by performing T*P (or T*P*2 if T*(2Q−1) is used in step (a)) inverse discrete Fourier transform (IDFT), to obtain time-domain coefficients $f_c(s)$ where s=0, 1, ..., T*P−1 (or T*P*2−1 if T*(2Q−1) is used in step (a)).

Step (f): Keep $T_c$-tap of coefficients in $f_c(s)$ numbered from 0 to $T_c-1$, where $T_c$ is either the largest integer (or odd number) of X<T*P/Q, or the smallest integer (or odd number) of X>T*P/Q.

Note that the steps given can be simplified in practice. For example, step (e) can be combined with step (f) to calculate the IDFT of only s=0, 1, . . . , $T_c$. As another example, step (f) may remove all of the trailing values from $T_c$, which is equivalent to frequency-domain down-sampling. Hence, the conversion from $F_c$ to time domain is equivalent to converting down-sampled $F_c$ (defined as $F_d$) to time domain. This down sampling ratio depends on the value of $T_c/(T*P)$ and is also an integer. In practice, the number of taps used in PMD compensation is relatively small (e.g., 13-tap). Therefore, the above procedure can be further simplified by a single equation.

For example, assume the main equalization path 110 processes at 1.5× the symbol rate, while channel estimation processes at 2× symbol rate. First, apply step (a) and pad the coefficient with 91 zeros, thus producing a 104-tap. Then, combine steps (b) through (d) and apply frequency-domain down sampling as described above. The result is:

$$F_d(k) = \sum_{n=0}^{12} f(n) e^{-j*2\pi(k*6+1)n/104} \quad (k=0 \ldots 5)$$

$$F_d(k) = \sum_{n=0}^{12} f(n) e^{-j*2\pi(k*6+27)n/104} \quad (k=7 \ldots 12)$$

$$F_d(6) = 0$$

Next, in combining steps (e) and (f) (considering already performed down-sample in frequency domain), the result is:

$$f_c(n) = \sum_{k=0}^{12} F_d(k) * e^{j*\frac{2\pi kn}{13}}$$

$$= \sum_{k=0}^{5} \sum_{m=0}^{12} f(m) e^{-j*\frac{2\pi(k*6+1)m}{104}} * e^{j*\frac{2\pi kn}{13}} +$$

$$\sum_{k=7}^{12} \sum_{m=0}^{12} f(m) e^{-j*\frac{2\pi(k*6+27)m}{104}} * e^{j*\frac{2\pi kn}{13}}$$

$$= \sum_{m=0}^{12} \left\{ \sum_{k=0}^{5} f(m) e^{-j*\frac{2\pi(k*6+1)m}{104}} * e^{j*\frac{2\pi kn}{13}} + \sum_{k=7}^{12} f(m) e^{-j*\frac{2\pi(k*6+27)m}{104}} * e^{j*\frac{2\pi kn}{13}} \right\}$$

$$= \sum_{m=0}^{12} f(m) \left\{ \sum_{k=0}^{5} e^{-j*\frac{2\pi(k*6+1)m}{104}} * e^{j*\frac{2\pi kn}{13}} + \sum_{k=7}^{12} e^{-j*\frac{2\pi(k*6+27)m}{104}} * e^{j*\frac{2\pi kn}{13}} \right\}$$

$$= \sum_{m=0}^{12} f(m) \cdot g(n, m)$$

where $$g(n, m) = \sum_{k=0}^{5} e^{-j*\frac{2\pi(k*6+1)}{104}} * e^{j*\frac{2\pi kn}{13}} + \sum_{k=7}^{12} e^{-j*\frac{2\pi(k*6+27)m}{104}} * e^{j*\frac{2\pi kn}{13}}$$

The above resampling can be implemented by pre-calculating g(n,m), which can be stored in registers or stored in memory. In one embodiment, g(n,m) is stored in memory, and $f_c(n)$ is calculated by an accumulating adder. This implementation is shown in FIG. 4.

Figure 4:
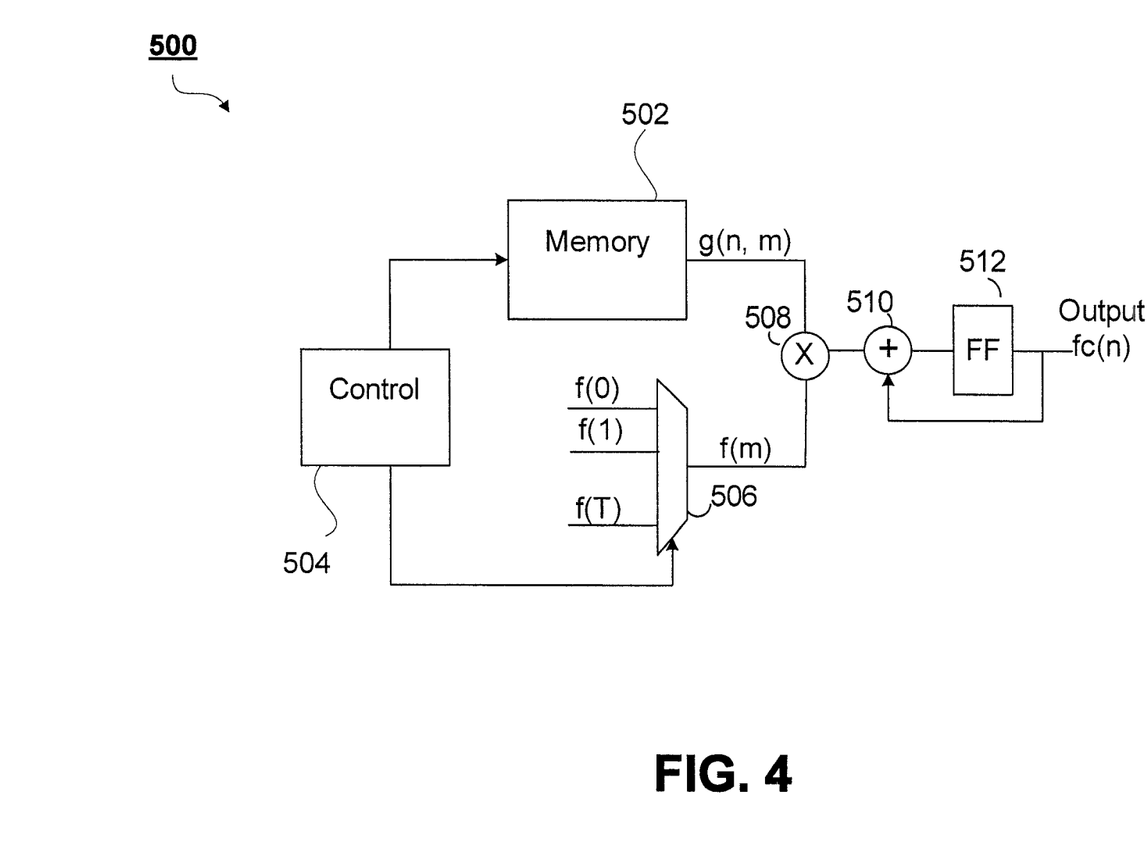
FIG. 4 is a schematic diagram illustrating an exemplary scheme for resampling channel parameters in accordance with present principles.

Referring to FIG. 4, a schematic diagram 500 is disclosed illustrating an exemplary scheme for resampling channel parameters in accordance with present principles. As shown therein, memory 502 stores pre-calculated g(n,m). Control block 504 provides the access address of g(n,m) in memory 502 to multiplexer 506. The control block 504 also selects the signal (e.g., f(0), f(1), etc.) which is input to multiplexer 506. Multiplexer 506 selects the proper coefficient, to be multiplied with g(n,m) by multiplier 508. The output from multiplier 508 is fed into an accumulator which consists of adder 510 and flip-flop or register 512. When all the g(n,m)*f(m) operations are done for a particular n, then the output $f_c(n)$ is ready.

The above described resampling can be performed in other ways as well. In another embodiment, g(n,m) are stored in registers, and the multiplication and adding operations performed in parallel. In an even further embodiment, coefficients resampling can also be done using a time-domain resampling method. This can be accomplished by interpolating to T*Q taps with zeros, applying a low-pass-filter, and then down-sampling by P.

After rate conversion operations have been performed, time-to-frequency-domain conversions can be performed. This may be achieved by padding $f_c(s)$ (s=0, 1, . . . , $T_c$−1) with B−$T_c$ zeros, where B is FFT block size used in PMD compensation, and then performing either FFT (or DFT since most of the taps are zeros) to obtain B-point spectrum elements.

Figure 5:
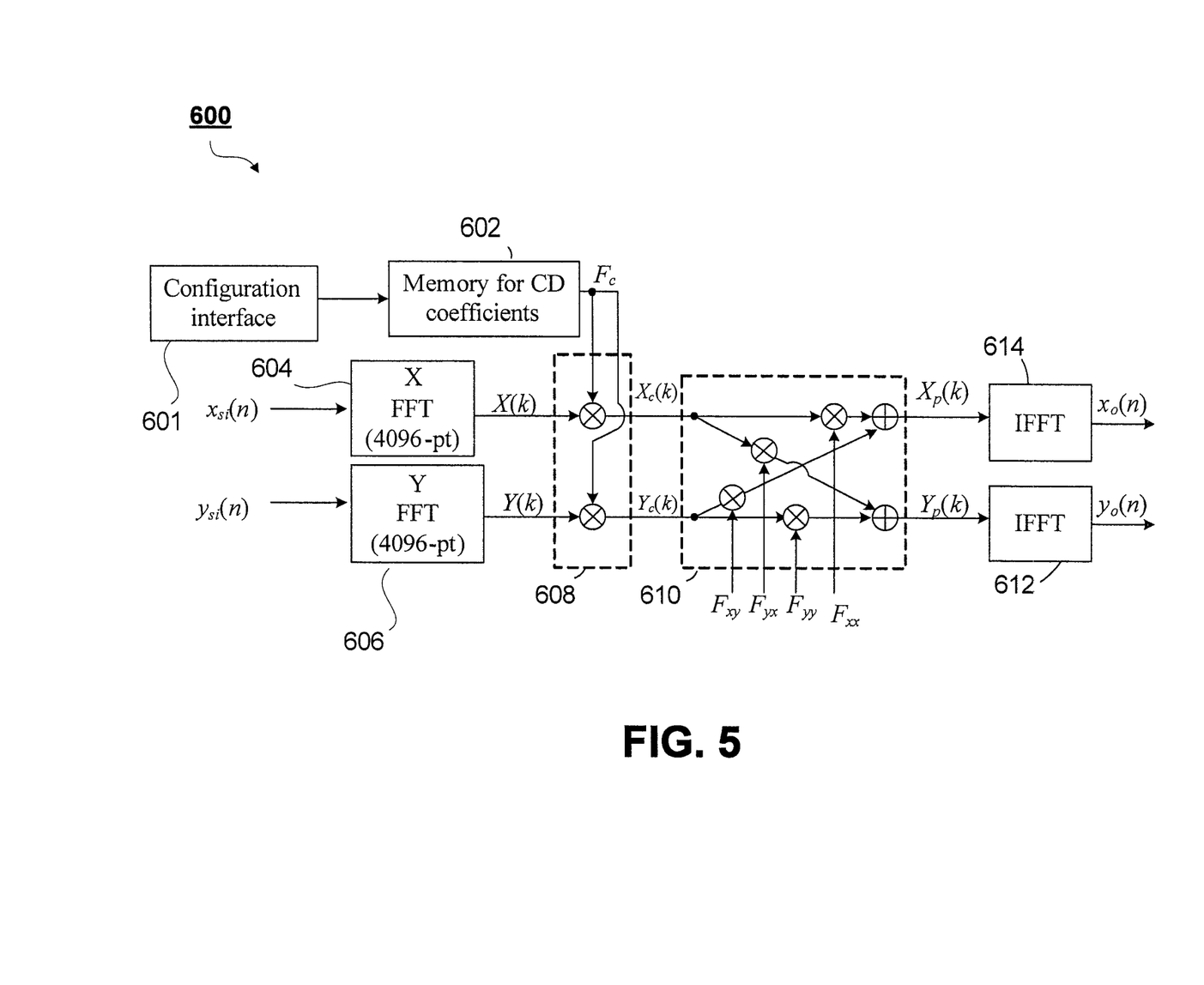
FIG. 5 is a schematic diagram illustrating an exemplary implementation of a main equalization path in accordance with present principles.

Moving on to FIG. 5, a schematic diagram 600 illustrates an exemplary manner of implementing the main equalization path 110 to recover signals that are generated using polarization multiplexing and either multiple phase-shift keying (M-PSK) modulation or multiple quadrature amplitude modulation (M-QAM).

With M-PSK or M-QAM modulation plus polarization multiplexing, there are two complex signals (i.e., $x_{si}(n)$ and $y_{si}(n)$) input to the signal equalization path, one for each polarization (identified as polarization X and Y). These inputs are coupled to FFT blocks 604 and 606, which converts the two signals to the frequency domain signals X(k) and Y(k). Although FFT blocks 604 and 606 are depicted as having 4096 points, it should be noted that the FFT block size can be any size (e.g., 512, 1024, 2048, etc.).

Frequency domain signals X(k) and Y(k) are first compensated by CD equalizer 608 (which may represent CD compensator 114 in FIG. 1). CD equalizer 608 consists of two complex multipliers. The CD compensation coefficients are read out from memory 602. Memory 602 is configurable from external interface 601, thus allowing for flexibility in selecting different fiber paths.

CD compensated signals $X_c(k)$ and $Y_c(k)$ are passed to PMD compensation block 610 (which may represent PMD compensator 116 in FIG. 1). PMD compensation block 610 provides for cross-equalization using channel coefficients $F_{xx}, F_{xy}, F_{yx}, F_{yy}$. The channel coefficients for PMD compensation are generated by a channel estimation block (not shown). Thus, although it is not disclosed in FIG. 5, it should be noted that the CD compensation outputs (i.e., $X_c(k)$ and $Y_c(k)$) are also sent to channel estimation block to calculate channel parameters/coefficients $F_{xx}, F_{xy}, F_{yx}, F_{yy}$.

After the signals have been processed by the PMD compensation block 610, the PMD compensated outputs (i.e., $X_p(k)$ and $Y_p(k)$) are converted back to time-domain by IFFT blocks 612 and 610. Output time-domain signals $X_o(n)$ and $Y_o(n)$ are then ready for further processing in time domain.

Figure 6:
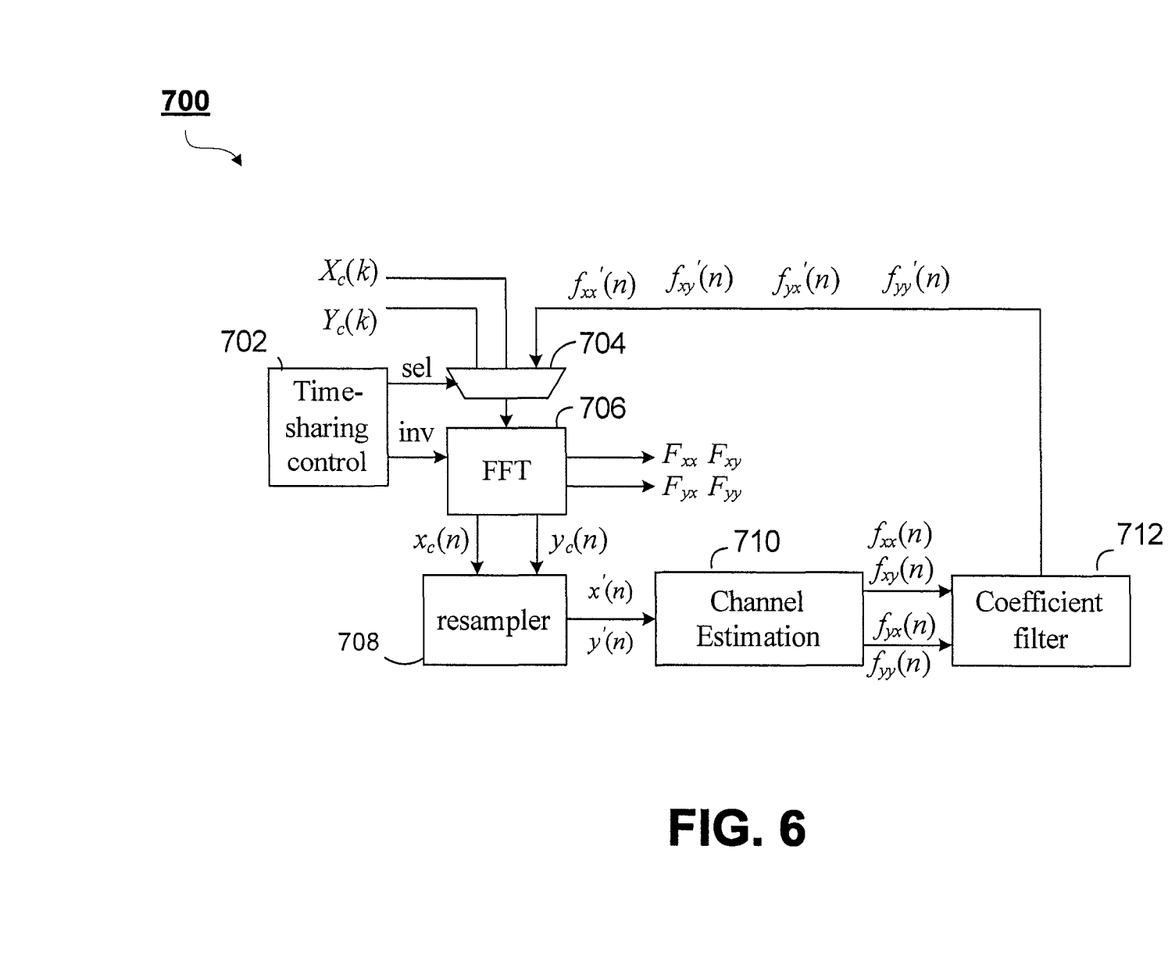
FIG. 6 is a schematic diagram illustrating resource sharing in a channel estimation path in accordance with present principles.

Referring now to FIG. 6, a schematic diagram 700 illustrates an exemplary manner of sharing resources in the channel estimation path 120. It should be noted that the primary bottleneck in the channel estimation path 120 will be channel estimation block 124 and the high resource consumption in FFT/IFFT core. Given such, in one embodiment, the FFT/IFFT core can be shared among different operations.

A single FFT core 706 is allocated for use by the whole channel estimation block. The FFT core 706 is shared by CD compensated signals $X_c(k)$ and $Y_c(k)$, and channel coefficients $f_{xx}'(n)$, $f_{xy}'(n)$, $f_{yx}'(n)$, $f_{yy}'(n)$. The sharing is controlled by block 702, which selects signals to be input to multiplexer 704 and controls whether FFT block 706 performs normal/forward FFT operations or inverse FFT operations. From block 706, signal outputs $x_c(n)$ and $y_c(n)$ are processed by resampler 708, channel estimation block 710 and coefficient filter 712. Frequency-domain coefficient outputs $F_{xx}$, $F_{xy}$, $F_{yx}$, $F_{yy}$ are connected to a coefficient filter 712 which performs PMD equalization using the coefficient outputs.

Having described preferred embodiments of a system and method for frequency-domain chromatic dispersion compensation and polarization mode dispersion compensation with time-domain channel estimation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for processing a signal, comprising:
   compensating for chromatic dispersion in a signal in a frequency-domain;
   estimating at least a portion of the signal which has been compensated for chromatic dispersion in a time-domain to produce channel parameters; and
   compensating for polarization mode dispersion in the signal in the frequency domain using the channel parameters;
   wherein a single fast Fourier transform core is used to convert signals from the frequency-domain to the time-domain and to convert channel parameters from the time-domain to the frequency-domain.

2. The method of claim 1, wherein chromatic dispersion compensation and polarization mode dispersion compensation are performed separately, and chromatic dispersion compensation is performed before polarization mode dispersion compensation.

3. The method of claim 1, wherein the channel parameters are converted from the time-domain to the frequency-domain before the channel parameters are used for polarization mode dispersion compensation.

4. The method of claim 1, wherein compensating for chromatic dispersion involves reading a chromatic dispersion coefficient from a storage device which is configurable by internal logic or an external interface.

5. The method of claim 1, wherein the signal is resampled to adjust for differing sampling rates in a receiver.

6. The method of claim 1, wherein the signal is resampled when input to a channel estimation path and the channel parameters are resampled before compensating for polarization mode dispersion.

7. A system for processing a signal, comprising:
   a first compensator configured to adjust a signal for chromatic dispersion in a frequency-domain;
   a channel estimator configured to estimate at least a portion of the signal which has been compensated for chromatic dispersion in a time-domain to produce channel parameters;
   a second compensator configured to adjust the signal for polarization mode dispersion in the frequency-domain using the channel parameters; and
   a channel estimation path that includes a single fast Fourier transform core is used to convert signals from the frequency-domain to the time-domain and to convert channel parameters from the time-domain to the frequency-domain.

8. The system of claim 7, wherein chromatic dispersion compensation and polarization mode dispersion compensation are performed separately, and chromatic dispersion compensation is performed before polarization mode dispersion compensation.

9. The system of claim 7, wherein the channel parameters are converted from the time-domain to the frequency-domain before the channel parameters are used for polarization mode dispersion compensation.

10. The system of claim 7, further comprising a storage device for storing a chromatic dispersion coefficient which is configurable by internal logic or an external interface.

11. The system of claim 7, wherein the channel parameters are converted to the frequency-domain using a discrete Fourier transform.

12. The system of claim 7, further comprising at least one resampling module for resampling the signal to adjust for differing sampling rates in a receiver.

13. The system of claim 12, wherein the signal is processed in the frequency-domain at a different sample rate than in the time-domain.

14. The system of claim 12, wherein the signal is resampled when input to a channel estimation path and the channel parameters are resampled before compensating for polarization mode dispersion.

15. A method for processing a signal, comprising:
    compensating for chromatic dispersion in a signal in a frequency-domain;
    estimating at least a portion of the signal which has been compensated for chromatic dispersion in a time-domain to produce channel parameters; and
    compensating for polarization mode dispersion in the signal in the frequency domain using the channel parameters;
    wherein the channel parameters are converted to the frequency-domain using a discrete Fourier transform and the signal is processed in the frequency-domain at a different sample rate than in the time-domain.

* * * * *